United States Patent
Higgins (10) Patent No.: US 9,725,862 B2
(45) Date of Patent: Aug. 8, 2017

(54) SUBMERSIBLE ISOLATION ENCLOSURE APPARATUS

(71) Applicant: P-Pod Technologies, LLC, Amesbury, MA (US)

(72) Inventor: Jonathan B. Higgins, Amesbury, MA (US)

(73) Assignee: P-Pod Technologies, LLC, Amesbury, MA (US)

( * ) Notice: Subject to any disclaimer, the term of this patent is extended or adjusted under 35 U.S.C. 154(b) by 0 days.

(21) Appl. No.: 15/045,794

(22) Filed: Feb. 17, 2016

(65) Prior Publication Data

US 2016/0237634 A1    Aug. 18, 2016

Related U.S. Application Data

(60) Provisional application No. 62/117,706, filed on Feb. 18, 2015.

(51) Int. Cl.
*B09C 1/00* (2006.01)
*E02B 3/02* (2006.01)
(Continued)

(52) U.S. Cl.
CPC .............. *E02B 3/023* (2013.01); *A01K 63/10* (2017.01); *B09C 1/00* (2013.01); *E02B 3/041* (2015.09);
(Continued)

(58) Field of Classification Search
CPC .............................. B09C 1/00; B09C 2101/00
(Continued)

(56) References Cited

U.S. PATENT DOCUMENTS

| | | | | | |
|---|---|---|---|---|---|
| 2,383,840 | A | * | 8/1945 | Benckert | B65D 88/78 114/257 |
| 3,664,136 | A | * | 5/1972 | Laval, Jr. | E21B 43/0122 405/60 |

(Continued)

FOREIGN PATENT DOCUMENTS

WO    WO 2016/134036 A1    8/2016

OTHER PUBLICATIONS

International Search Report and Written Opinion of the International Searching Authority, mailed Jul. 29, 2016 for International Application No. PCT/US2016/018297 titled "Submersible Isolation Enclosure Apparatus".

*Primary Examiner* — Frederick L Lagman
(74) *Attorney, Agent, or Firm* — Hamilton, Brook, Smith & Reynolds, P.C.

(57) ABSTRACT

Submersible isolation enclosure apparatus constructed of flexible, water resistant to water proof fabric or sheeting for enclosing and isolating selected areas of water bottom and water volume from surrounding water with access to the isolated bottom area exposed within a Base Member through one or more closed wall, tubular Access Member(s) connected to the Base Member and accessible from the water surface. Center-radial and perimeter portions of the Base Member fitted with attachment points and one or more tubular, closed wall Sleeve Members to allow for use of floatation, internal supporting rods or piping, and weights, to assist in the movement, positioning, shaping and securing of the apparatus to the selected water bottom area. Flexible fabric and weighting system allows the lower perimeter of the Base Member to conform to bottom structure.

18 Claims, 4 Drawing Sheets

(51) Int. Cl.
*E02B 3/04* (2006.01)
*A01K 63/10* (2017.01)
*E02B 15/00* (2006.01)

(52) U.S. Cl.
CPC ..... *B09C 2101/00* (2013.01); *E02B 2015/005* (2013.01)

(58) Field of Classification Search
USPC .................................................. 405/60, 210
See application file for complete search history.

(56) References Cited

U.S. PATENT DOCUMENTS

| | | | |
|---|---|---|---|
| 3,851,487 A * | 12/1974 | Lambertsen | B63C 11/34 114/257 |
| 4,047,390 A * | 9/1977 | Boyce, II | B63C 7/006 405/188 |
| 4,373,834 A * | 2/1983 | Grace | E21B 43/0122 405/209 |
| 4,395,157 A * | 7/1983 | Cunningham | E21B 43/0122 405/195.1 |
| 4,421,436 A | 12/1983 | Burns | |
| 4,449,850 A * | 5/1984 | Cessou | E21B 41/005 210/923 |
| 4,645,379 A | 2/1987 | Grimsley | |
| 6,457,907 B1 * | 10/2002 | De Bloeme | B63C 11/44 114/314 |
| 6,592,299 B1 | 7/2003 | Becker | |
| 8,523,482 B1 * | 9/2013 | Watson, Sr. | E21B 43/0122 405/210 |
| 8,534,365 B2 * | 9/2013 | Dighe | E21B 43/0122 166/363 |
| 8,678,707 B1 | 3/2014 | Powell | |
| 8,911,619 B2 * | 12/2014 | Becker | E02B 15/046 210/170.05 |
| 9,073,105 B2 * | 7/2015 | Higgins | B09C 1/00 |
| 2011/0318106 A1 * | 12/2011 | Gateff | B63C 7/006 405/60 |
| 2012/0051840 A1 * | 3/2012 | Hatton | E21B 43/0122 405/60 |
| 2013/0108369 A1 | 5/2013 | Splittstoesser | |
| 2013/0146546 A1 * | 6/2013 | Goulet | C02F 1/40 210/747.5 |
| 2015/0023734 A1 | 1/2015 | Higgins | |

* cited by examiner

FIGURE 1

SUBMERSIBLE ISOLATION ENCLOSURE APPARATUS

RELATED APPLICATION

This application claims the benefit of U.S. Provisional Application No. 62/117,706, filed on Feb. 18, 2015. The entire teachings of the above application are incorporated herein by reference.

BACKGROUND

There is a need for devices and methods for removing contaminants, sediments and detritus from water bodies and for controlling aquatic fauna and flora in water bodies.

SUMMARY OF THE INVENTION

In one aspect, the invention pertains to a submersible aquatic enclosure apparatus for removal of contaminants, sediments and detritus from a target area of a water body, or for controlling aquatic fauna and flora within a targeted area of a water body, comprising: a Base Member enclosure of flexible water resistant to water proof material having an exterior, an interior and an open bottom to contact the target area of the water body, wherein at the open bottom of the Base Member is a perimeter comprising flexible water resistant to water proof material configured into at least one Sleeve Member to receive floatation member, rigid rods or piping for structural support, or weights, to move, shape, position, or hold the Base Member over the target area; and at least one tubular Access Member of flexible water resistant to water proof material connected to the exterior of the Base Member and extending in the direction of the surface of the water body, the tubular Access Member having an exterior and an interior wherein the interior is configured to allow fluids and solids to enter and exit the interior of the Base Member.

In one embodiment, the submersible enclosure apparatus further comprises attachment points on the exterior of the base member and optionally on the exterior of the at least one tubular access member, for attaching one or more accessories to the enclosure apparatus.

In one embodiment, the enclosure apparatus comprises one or more accessories selected from weights, buoys, structural supports for the Base Member, suspension cables or ropes.

In another embodiment, the enclosure apparatus comprises at least one tubular Access Member that is of sufficient length to extend to the surface of the water body when the enclosure apparatus is deployed at the target area.

In some embodiments, the enclosure apparatus comprises a Base Member enclosure that is a pyramidal or conical shape.

In other embodiments, the enclosure apparatus further comprises at least one buoy at the water surface connected to the enclosure apparatus.

In another embodiment, the enclosure apparatus can be configured to have at least one additional enclosure apparatus linked to the exterior of the enclosure apparatus to form a greater aerial coverage over the target area than available by the aerial coverage of a single enclosure apparatus. For example, the linkage to the at least one additional enclosure apparatus is by coupling attachment points present on each enclosure apparatus. In another example, the at least one Access Member can be connected to the at least one Access Member of an adjoining enclosure apparatus to allow for the exchange of fluids between connected apparatus.

In some embodiments, the enclosure apparatus further comprises incorporating weights within the Sleeve Members to secure and conform the Base Member enclosure to the water bottom.

In other embodiments, the enclosure apparatus further comprises piping or rigid rods inserted into the sleeve member.

The enclosure apparatus comprises an opening (8) on the at least one Access Member.

In one embodiment, the flexible water resistant to water proof material is coated with a biologic or chemical substance selected from aerobic bacterial culture, anaerobic bacterial cultures, pesticides, proteins, chemical oxidants or mixtures containing aluminum, iron, lanthanum and manganese.

In another embodiment, along the lower perimeter of the Base Member is a Sleeve Member provided on the exterior of the Base Member for flotation; a Sleeve Member provided on the exterior of the Base Member for providing internal structure to the Base Member enclosure; a Sleeve Member provided on the interior of the Base Member for weighting down the apparatus at the target site of the water body; and center-radial sleeve members.

In another aspect, the invention pertains to a method for isolating and removing contaminants, detritus and sediments in a target area of a water body, comprising: deploying the collapsible enclosure apparatus, as described herein, on top of the target area in the water body to contain contaminants, detritus and sediments within the interior of the enclosure; suspending or dissociating the contaminants, sediments and detritus by physically disturbing or chemically altering the water, sediments and detritus within the enclosure; and pumping the contaminants, detritus and sediments out of the enclosure through the at least one Access Member and allowing the enclosure to collapse, to thereby isolate and remove the contaminants, detritus and the sediments in the target area of the water body.

In one embodiment, the method is performed using a plurality of enclosures linked together are deployed onto the target area.

In another aspect, the invention pertains to a method for controlling aquatic flora and fauna in a targeted area of a water body, comprising: deploying a collapsible enclosure apparatus, as described herein, on top of the target area in the water body to contain the flora and fauna within the interior of the enclosure; controlling the targeted flora and fauna within the enclosure; pumping the contaminants, detritus, sediments and targeted flora and fauna residues out of the enclosure through the at least one Access Member and allowing the enclosure to collapse; and optionally treating the water within the enclosure to control the flora or fauna in the target area.

BRIEF DESCRIPTION OF THE DRAWINGS

The foregoing will be apparent from the following more particular description of example embodiments of the invention, as illustrated in the accompanying drawings in which.

DETAILED DESCRIPTION OF THE INVENTION

A description of example embodiments of the invention follows.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

A submersible enclosure apparatus for isolating from surrounding water, selected areas of water bottom together with a volume of water extending upwardly from said bottom areas, comprised of a flexible closed wall Base Member open to and bounding the selected bottom area, the perimeter and body of the Base Member being configured with attachment points and one or more tubular Sleeve Members for floatation, internal addition of rigid rods or piping for structural support, and addition of weights, to move, shape, position, and hold the Base Member against the selected water bottom area, and one or more flexible closed wall tubular Access Members connected to the Base Member and allowing for access into and controlled removal of liquids, solids or gases from the enclosed Base Member area. Each Base Member of the apparatus can be of any shape or dimension and each of one or more connecting tubular Access Members would have a cross-section area less than the Base Member. Tubular Access Members would be accessible from the water surface, could be connected to other Base Member tubular Access Members or extended to a land area. Each apparatus is scalable by attaching a plurality of apparatus together at Base Member perimeter attachments or at tubular Sleeve Members to provide additional coverage. Flexible closed wall material to be a water resistant to water proof fabric or sheeting.

The present invention applies to a flexible, closed wall, water resistant to water proof enclosure that can be submerged to isolate a selected area of water bottom and accessed from the water surface through one or more closed wall, tubular Access Member(s) connected to the exterior of the Base Member and open to the enclosed water bottom area of the Base Member. The term "water resistant to water proof" is intended to cover any fabric or sheeting that is water resistant or water proof and fabrics that are have varying degrees of water resistance. Examples of suitable fabrics that can be used in the invention include but are not limited to polyester, nylon, polyurethane, polyethylene, polyvinyl chloride-coated fabrics or polyurethane-coated fabrics.

The features of the enclosure follow and are further illustrated by the accompanying drawings.

The enclosure comprises a flexible, closed wall Base Member (1) constructed of water resistant to water proof fabric or sheeting and open at the bottom to the water bottom surface.

There are one or more flexible, closed wall tubular Sleeve Members (2) fixed along the perimeter edge of, and center-radials on, the Base Member that can be inflated with gas or accept floatation, weighted, or fitted with rigid rods or piping, to assist in moving, shaping, positioning and securing the apparatus to a water bottom area.

At least one flexible, tubular, closed wall Access Member (3) is constructed of water resistant to water proof fabric or sheeting, connected to the Base Member, extending to or towards the water surface, and allowing for both the controlled release of gases and for removal of liquids (collectively referred to herein as "fluids") or solids from within the enclosed Base Member area. In some embodiments, the horizontal cross-sectional area of each Access Member would be less than the Base Member's horizontal cross-sectional area in a deployed configuration of the apparatus.

Attachment Loops (4) are situated around the perimeter of the Base Member and at upper and lower portions of the at least one Access Member for connecting one or more accessories to the Base Member and optionally to the at least one Access Member. Accessories include but are not limited to floating buoys, suspension cables or ropes, piping or rigid rods, weights, anchors. See Figures for configurations of the attachment loops and accessories.

In some embodiments, piping or rigid rods inserted into perimeter Sleeve Members can be connected to opposing Base Member perimeter Attachment Loops (4) and Sleeve Members to aid in deploying each apparatus.

Optionally, one or more suspension cables or ropes (5) attached to one or more floating buoys (6) can be connected to the Base Member or to Access Members or both.

An Adjustable Closure can be attached to opening (8) on each Access Member to control the release of gases, to allow for the controlled removal of liquids or solids from the enclosed area of the Base Member, and to allow for aquatic fauna such as fish, insects or turtles to leave the enclosed Base Member area after deployment of each apparatus.

The Sleeve Members (2), attachment loops (4) and associated internal weights, rods or piping, and exterior Anchors (8) can be used to maximize the shape and operation of the Base Member enclosure area. In a preferred embodiment, the enclosure apparatus of the invention will have three Sleeve Members along the lower perimeter of the Base Member; wherein one Sleeve Member is provided on the exterior of the Base Member for flotation; one Sleeve Member is provided on the exterior of the Base Member for providing structure to the apparatus; and one Sleeve Member is provided on the interior of the Base Member's lower perimeter for weighting down the apparatus at the target site of the water body.

Figure 1:
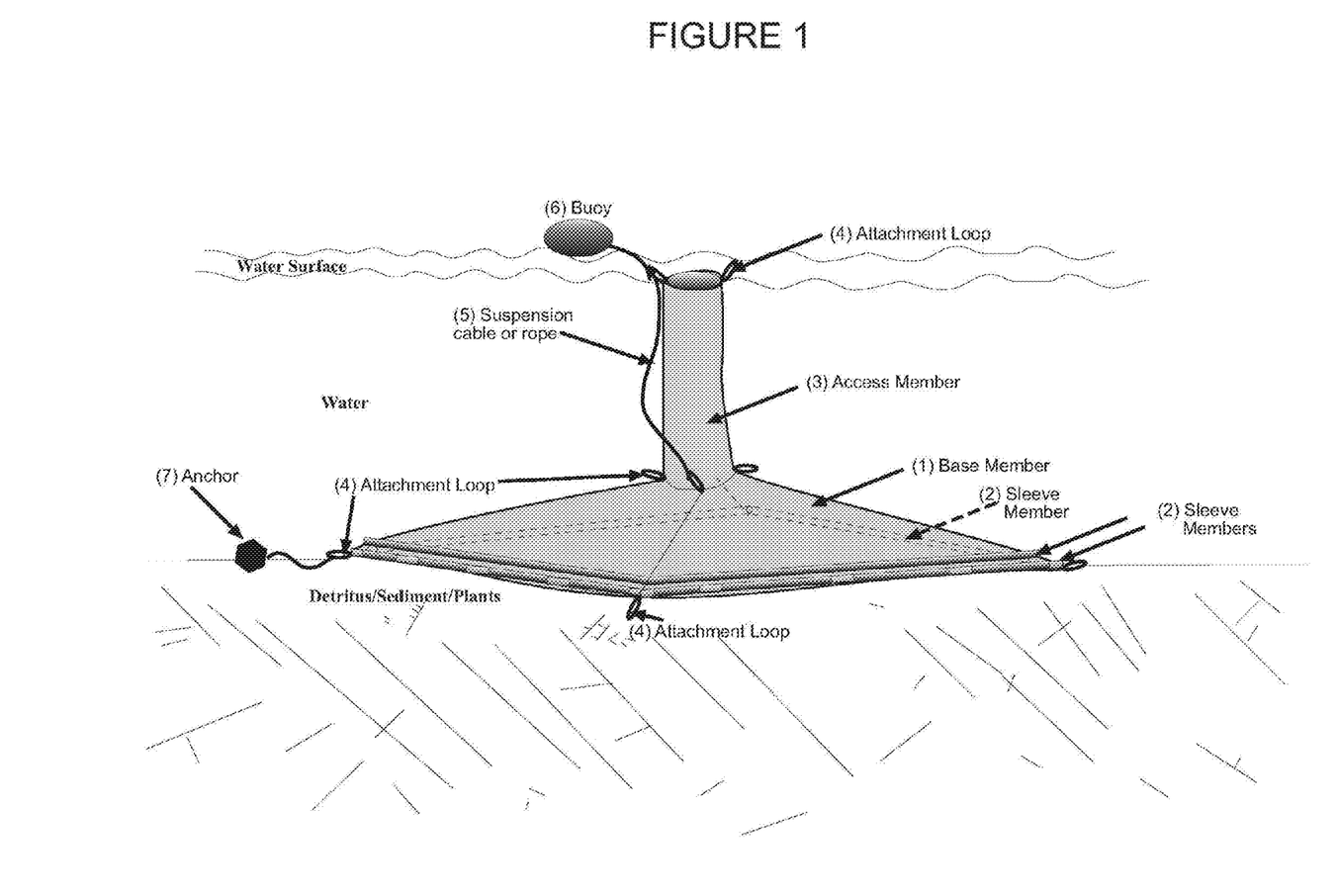
FIG. 1 shows a general schematic of a rectangular apparatus of the invention.
Figure 2:
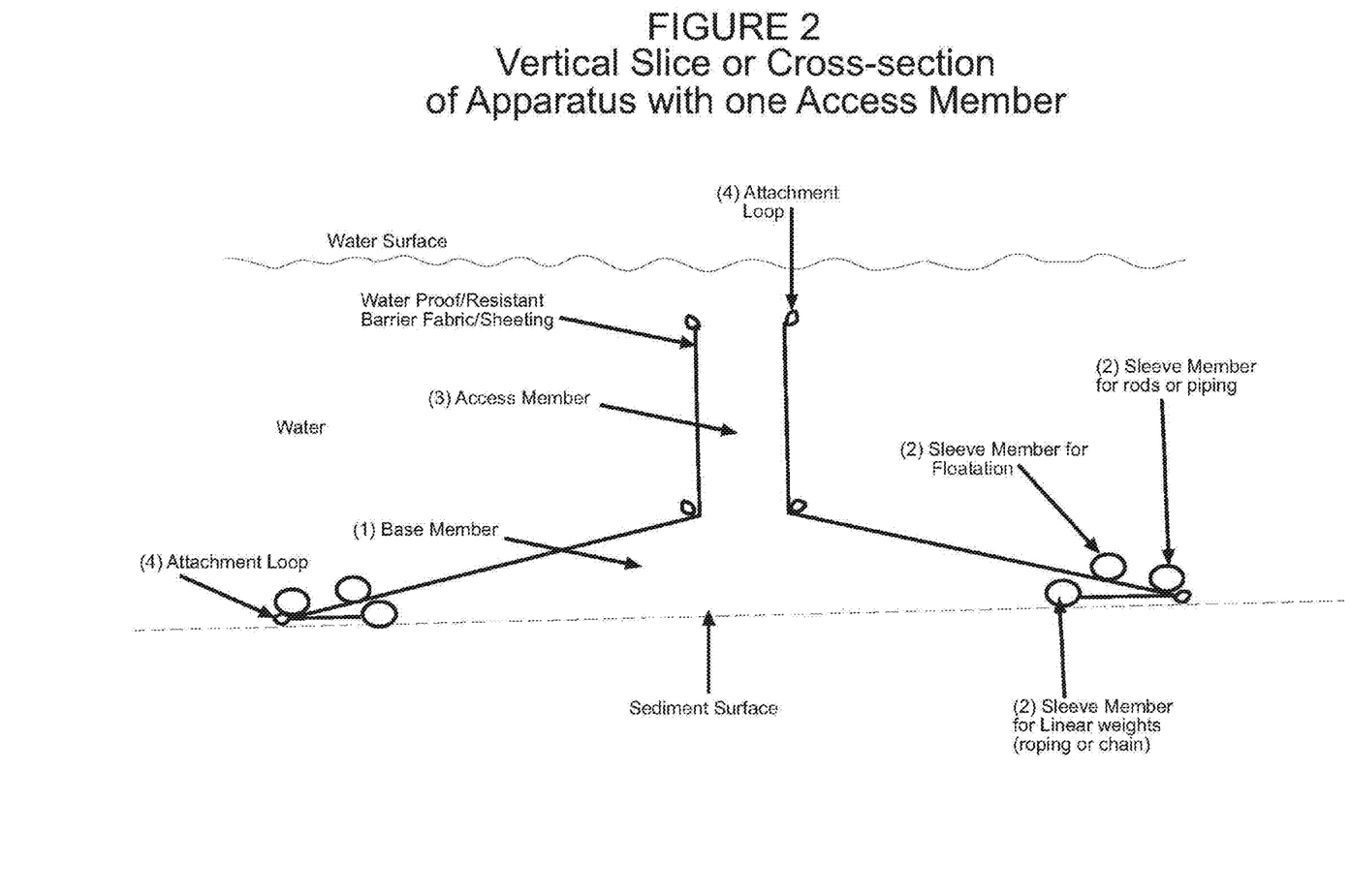
FIG. 2 shows a vertical cross-section of an embodiment apparatus with one access member.
Figure 3:
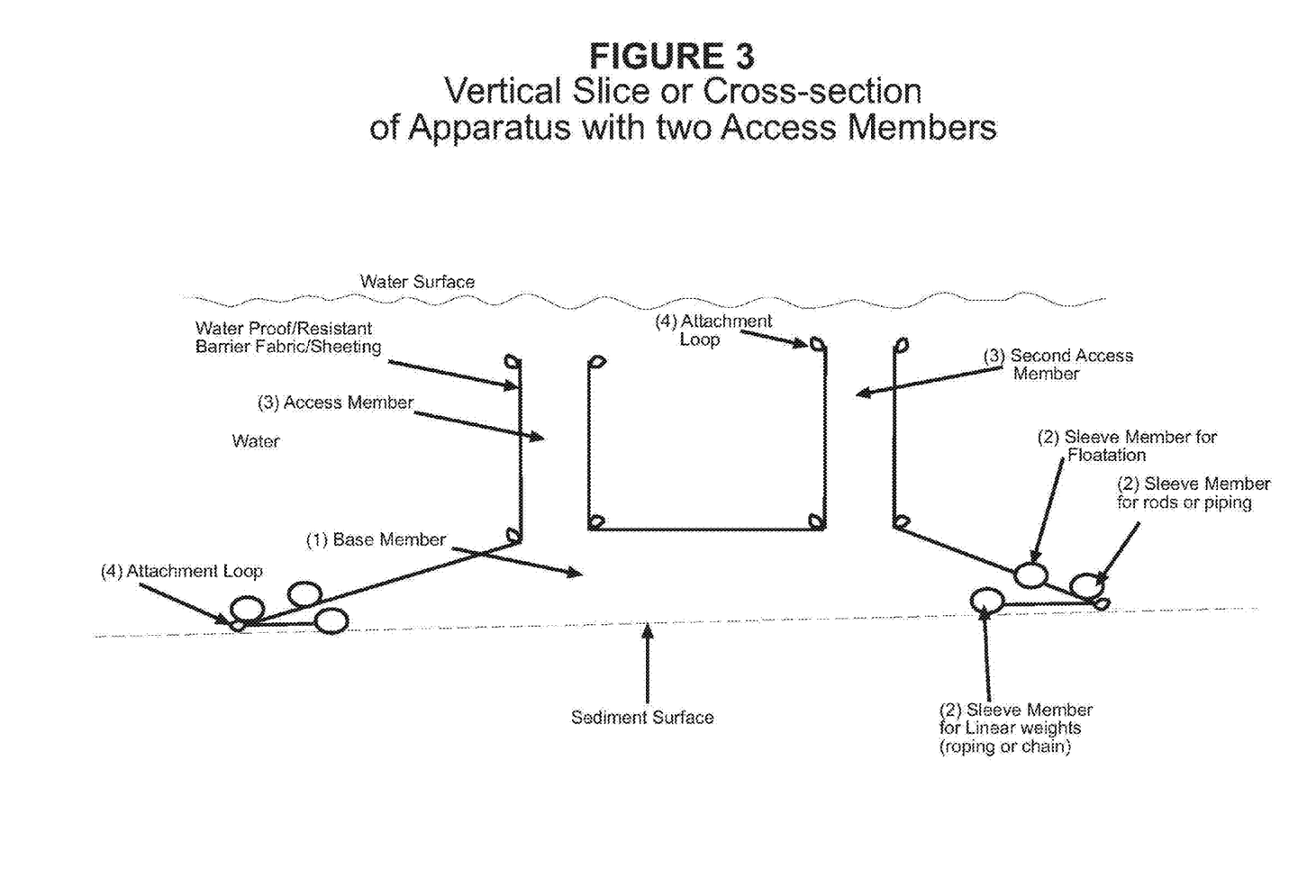
FIG. 3 shows a vertical cross-section of an embodiment apparatus with two access members.
Figure 4:
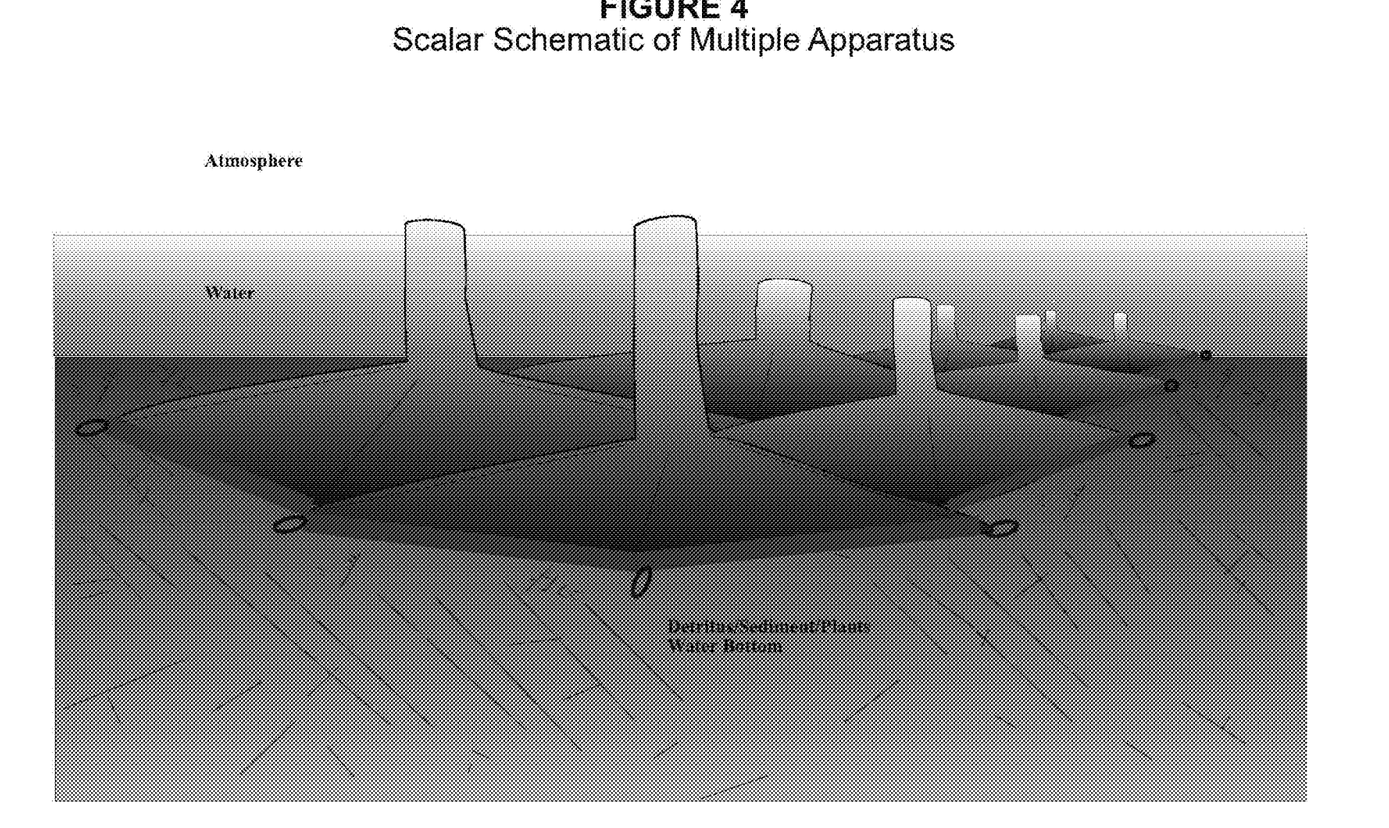
FIG. 4 shows a scalar schematic of multiple apparatus.

The Base Member can be any three-dimensional shape with one side open to the water bottom but preferably, a pyramidal shape (FIGS. 1 and 2) that encloses a high ratio of water bottom area to interior water volume for a given water bottom structure or topography.

A plurality of apparatus can be linked together using attachment loops (4) and Sleeve Members (2) to provide additional application coverage for selected water bottom areas.

Access Members (3) can be joined with other apparatus Access Members to allow the interior of each Base Member to be interconnected with other apparatus Base Members and collectively then, be accessible by one or more Access Members accessible at the water surface, to a land area, or to one or more fixed or mobile structures on the water body.

Weighted chains, weighted rope or flowable fill with a specific gravity greater than the liquid in the selected area can be used in one or more Sleeve Members to secure and conform the Base Member to the water bottom. Anchors can also be used to secure the apparatus at attachment loops The primary function of the apparatus is to provide a flexible, submersible enclosure constructed using water resistant to water proof fabric or sheeting to isolate a selected water bottom area and discrete volume of water within the apparatus from water surrounding the apparatus and which conforms to the water bottom topography while at the same time allowing for access by the user through tubular Access Members to the enclosed area within the Base Member.

A secondary function of the apparatus is to allow for the targeted alteration of physical, biological or chemical conditions within the isolated area in the Base Member to affect a desired outcome such as: limiting the amount of sunlight reaching the water bottom and enclosed plants; allowing or enhancing the biodegradation of organic matter; the addition of one or more chemicals, such as pesticides, to alter conditions within the enclosure while minimizing chemical changes outside the enclosure; and, the disturbance or removal of physical materials such as contaminants, detritus, gas, liquid, minerals, nutrients, or sediment from within the Base Member while minimizing disturbance outside the Base Member. The apparatus can be left in place until monitoring of physical and chemical conditions within the isolated area of the enclosure indicated that conditions had stabilized or reached acceptable criteria such as allowing sufficient time for a pesticide or similar chemical application within the enclosure to normalize or ameliorate relative to unenclosed conditions or pre-determined requirements.

A third function of the apparatus is to minimize the potential for physical, biological or chemical conditions outside the apparatus to alter conditions within the enclosed area of the apparatus.

A fourth function of the apparatus is, after deployment, to allow for aquatic fauna such as fish, insects or turtles to leave the apparatus' enclosed Base Member area through the tubular Access Member(s).

A fifth function of the apparatus is to be scalable with a plurality of other apparatus by fixing each apparatus together along perimeter attachment points, and to allow for the connection of tubular access members between apparatus in a manner which would connect the interior, isolated area of each apparatus with a plurality of other apparatus' Base Members and to one or more control Access Members points either at the water surface or extending to a land area.

A sixth function is for the fabric of the apparatus, after being treated with biologic or chemical substances, to serve as a sorbent or reactive material for removal of soluble substances or control of flora and fauna within the enclosed area of the Base Member. Examples of biologic or chemical substances include, but are not limited to, aerobic and anaerobic bacterial cultures, pesticides, proteins, chemical oxidants, and mixtures containing aluminum, iron, lanthanum, manganese and combinations thereof.

A seventh function is for the apparatus to serve as a hydraulic barrier and collection mechanism to capture, remove or treat contaminated ground water and sediment pore water that would otherwise flow into and impact wetland and surface water resource areas.

What is claimed is:

1. A submersible aquatic collapsible enclosure apparatus for removal of contaminants, sediments and detritus from a target area of a water body, or for controlling aquatic fauna and flora within a target area of a water body, comprising:
   a base member enclosure of flexible water resistant to water proof material having an exterior, an interior, sloping walls and a rectangular shaped open bottom to contact the target area of the water body, wherein at the open bottom of the base member is a perimeter comprising flexible water resistant to water proof material configured into at least one sleeve member to receive floatation member, rigid rods or piping for structural support, or weights, to move, shape, position, or hold the base member over the target area;
   at least one tubular access member of flexible water resistant to water proof material connected to the exterior of the base member and extending in the direction of the surface of the water body, the tubular access member having an exterior and an interior wherein the interior is configured to allow fluids and solids to enter and exit the interior of the base member and at least one additional enclosure apparatus linked to the exterior of the enclosure apparatus to form a greater aerial coverage over the target area than available by the aerial coverage of a single enclosure apparatus.

2. The enclosure apparatus of claim 1, further comprising attachment points on the exterior of the base member, for attaching one or more accessories to the enclosure apparatus.

3. The enclosure apparatus of claim 2, wherein the one or more accessories are selected from weights, buoys, structural supports for the base member, suspension cables or ropes.

4. The enclosure apparatus of claim 1, wherein the at least one tubular access member is of sufficient length to extend to the surface of the water body when the enclosure apparatus is deployed at the target area.

5. The enclosure apparatus of claim 1, wherein the base member enclosure has a pyramidal or conical shape.

6. The enclosure apparatus of claim 1, further comprising at least one buoy at the water surface connected to the enclosure apparatus.

7. The enclosure apparatus of claim 1, wherein the linkage to the at least one additional enclosure apparatus is by coupling attachment points present on each enclosure apparatus.

8. The enclosure apparatus of claim 1 further comprising incorporating weights within the at least one sleeve member to secure and conform the base member enclosure to the water bottom.

9. The enclosure apparatus of claim 1, further comprising piping or rigid rods inserted into the at least one sleeve member.

10. The enclosure apparatus of claim 1, wherein the flexible water resistant to water proof material is coated with a biologic or chemical substance selected from aerobic bacterial culture, anaerobic bacterial cultures, pesticides, proteins, chemical oxidants or mixtures containing aluminum, iron, lanthanum, manganese, or combinations thereof.

11. The enclosure apparatus of claim 1, wherein along the lower perimeter of the base member is a sleeve member provided on the exterior of the base member for flotation; a sleeve member provided on the exterior of the base member for providing internal structure to the base member enclosure; a sleeve member provided on the interior of the base member for weighting down the apparatus at the target site of the water body; and center-radial sleeve members.

12. The enclosure apparatus of claim 1, further comprising attachment points on the exterior of the at least one tubular access member, for attaching one or more accessories to the enclosure apparatus.

13. The enclosure apparatus of claim 12, wherein the one or more accessories are selected from weights, buoys, structural supports for the base member, suspension cables or ropes.

14. The enclosure apparatus of claim 1, wherein when the enclosure is not in a collapsed position, the height of the base member is small relative to the rectangular shaped open bottom, to thereby provide a high ratio of water bottom area to interior volume.

15. A method for isolating and removing contaminants, detritus and sediments in a target area of a water body, comprising:
   deploying a collapsible enclosure apparatus on top of the target area in the water body to contain contaminants, detritus and sediments within the interior of the enclosure;
   suspending or dissociating the contaminants, sediments and detritus by physically disturbing or chemically altering the water, sediments and detritus within the enclosure; and
   collapsing the enclosure by pumping the contaminants, detritus and sediments out of the enclosure through the at least one access member, to thereby isolate and remove the contaminants, detritus and the sediments in the target area of the water body,
   wherein the collapsible enclosure apparatus comprises:
   a base member enclosure of flexible water resistant to water proof material having an exterior, an interior, sloping walls and a rectangular shaped open bottom to contact the target area of the water body, wherein at the open bottom of the base member is a perimeter comprising flexible water resistant to water proof material configured into at least one sleeve member to receive floatation member, rigid rods or piping for structural support, or weights, to move, shape, position, or hold the base member over the target area; and
   at least one tubular access member of flexible water resistant to water proof material connected to the exterior of the base member and extending in the direction of the surface of the water body, the tubular access member having an exterior and an interior wherein the interior is configured to allow fluids and solids to enter and exit the interior of the base member.

16. The method of claim 15, wherein a plurality of enclosures linked together are deployed onto the target area.

17. A method for controlling aquatic flora and fauna in a target area of a water body, comprising:
   deploying a collapsible enclosure apparatus on top of the target area in the water body to contain the flora and fauna within the interior of the enclosure;
   controlling the targeted flora and fauna within the enclosure;
   collapsing the enclosure by pumping the contaminants, detritus, sediments and targeted flora and fauna residues out of the enclosure through the at least one access member;
   wherein the collapsible enclosure apparatus comprises:
   a base member enclosure of flexible water resistant to water proof material having an exterior, an interior, sloping walls and a rectangular shaped open bottom to contact the target area of the water body, wherein at the open bottom of the base member is a perimeter comprising flexible water resistant to water proof material configured into at least one sleeve member to receive floatation member, rigid rods or piping for structural support, or weights, to move, shape, position, or hold the base member over the target area; and
   at least one tubular access member of flexible water resistant to water proof material connected to the exterior of the base member and extending in the direction of the surface of the water body, the tubular access member having an exterior and an interior wherein the interior is configured to allow fluids and solids to enter and exit the interior of the base member.

18. The method of claim 17, further comprising treating the water within the enclosure to control the flora or fauna in the target area.

* * * * *

UNITED STATES PATENT AND TRADEMARK OFFICE
CERTIFICATE OF CORRECTION

PATENT NO. : 9,725,862 B2
APPLICATION NO. : 15/045794
DATED : August 8, 2017
INVENTOR(S) : Jonathan B. Higgins Page 1 of 1

It is certified that error appears in the above-identified patent and that said Letters Patent is hereby corrected as shown below:

In the Claims

In Claim 1, Column 6, Lines 7-17, replace:
"at least one tubular access member of flexible water resistant to water proof material connected to the exterior of the base member and extending in the direction of the surface of the water body, the tubular access member having an exterior and an interior wherein the interior is configured to allow fluids and solids to enter and exit the interior of the base member and at least one additional enclosure apparatus linked to the exterior of the enclosure apparatus to form a greater aerial coverage over the target area than available by the aerial coverage of a single enclosure apparatus."

With:
-- at least one tubular access member of flexible water resistant to water proof material connected to the exterior of the base member and extending in the direction of the surface of the water body, the tubular access member having an exterior and an interior wherein the interior is configured to allow fluids and solids to enter and exit the interior of the base member; and
 at least one additional enclosure apparatus linked to the exterior of the enclosure apparatus to form a greater aerial coverage over the target area than available by the aerial coverage of a single enclosure apparatus. --

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*